(12) United States Patent
Madson et al.

(10) Patent No.: US 12,404,010 B2
(45) Date of Patent: Sep. 2, 2025

(54) SENSOR FUSION CONTROLLER FOR FAULT TOLERANT EMA

(71) Applicant: Eaton Intelligent Power Limited, Dublin (IE)

(72) Inventors: Ryan Madson, Dassel, MN (US); Meng Wang, Eden Prairie, MN (US); Richard Strong Wallace, Jr., Saint Joseph, MI (US)

(73) Assignee: Eaton Intelligent Power Limited, Dublin (IE)

( * ) Notice: Subject to any disclaimer, the term of this patent is extended or adjusted under 35 U.S.C. 154(b) by 79 days.

(21) Appl. No.: 18/486,894

(22) Filed: Oct. 13, 2023

(65) Prior Publication Data

US 2024/0132203 A1 Apr. 25, 2024

Related U.S. Application Data

(60) Provisional application No. 63/416,259, filed on Oct. 14, 2022.

(51) Int. Cl.
*B64C 13/00* (2006.01)
*B64C 13/50* (2006.01)
*B64D 45/00* (2006.01)

(52) U.S. Cl.
CPC ...... *B64C 13/50* (2013.01); *B64D 2045/0085* (2013.01)

(58) Field of Classification Search
CPC ... B64C 13/50; B64D 2045/0085; G01D 3/08
See application file for complete search history.

(56) References Cited

U.S. PATENT DOCUMENTS 8,604,741 B2   12/2013 Lebrun
10,086,953 B1 * 10/2018 Li .................... H05B 45/30
(Continued)

FOREIGN PATENT DOCUMENTS

DE   102020117931 B3   10/2021
KR   1020100061946 A    12/2008
(Continued)

OTHER PUBLICATIONS

Bennett, "Fault Tolerant Electromechanical Actuators for Aircraft," thesis submitted for the degree of Doctor of Philosophy, Newcastle University, 236 pages (Nov. 2010).
(Continued)

*Primary Examiner* — Ian Jen
(74) *Attorney, Agent, or Firm* — MERCHANT & GOULD P.C.

(57) ABSTRACT

Systems and methods for fault toleration actuation include an actuator with a position. A first sensor measures a first parameter associated with the actuator. A second sensor measures a second parameter associated with the actuator. A sensor fusion module receives data from each of the first and second sensor and executes a sensor fusion process on the data received to estimate the position of the actuator. A fault detection module is configured to receive data from the first and second sensor, to receive sensor fusion data from the sensor fusion module, to compare the data received from the first and second sensor with the sensor fusion estimate, to identify an error in the data received from either of the first or second sensor based on the comparison, and to determine a fault exists in the first or second sensor based on the error.

20 Claims, 5 Drawing Sheets

(56) References Cited

U.S. PATENT DOCUMENTS

| | | |
|---|---|---|
| 10,431,019 B2 | 10/2019 | Dorkel et al. |
| 10,589,871 B2 | 3/2020 | Harrington et al. |
| 10,780,977 B2 | 9/2020 | Baines et al. |
| 2004/0216000 A1 | 10/2004 | Koehler et al. |
| 2007/0007385 A1 | 1/2007 | Potter et al. |
| 2010/0229975 A1 | 9/2010 | Sweeney et al. |
| 2011/0255968 A1 | 10/2011 | Recksiek |
| 2020/0156766 A1 | 5/2020 | Tzabari |

FOREIGN PATENT DOCUMENTS

| | | |
|---|---|---|
| KR | 101749134 B1 | 6/2017 |
| KR | 101890313 B1 | 8/2018 |
| UA | 98659 U | 5/2015 |

OTHER PUBLICATIONS

Extended European Search Report for Application No. 23203439.7 mailed Mar. 27, 2024.

* cited by examiner

SENSOR FUSION CONTROLLER FOR FAULT TOLERANT EMA

CROSS-REFERENCE TO RELATED APPLICATION

This application claims the benefit of U.S. Provisional Patent Application No. 63/416,259, filed on Oct. 14, 2022, the disclosure of which is incorporated herein by reference in its entirety.

BACKGROUND

The aerospace industry trend of More Electric Aircraft (MEA) is driven by a desire for a more reliable, lighter, greener, and more technologically advanced aircraft. To achieve this goal, the secondary flight control mechanisms are shifting from conventional hydraulic/mechanical systems to more distributed electro-mechanical systems, for example relying more upon electro-mechanical actuators (EMA) to operate some components. EMA is replacing the more traditional controls which are based on rotary input from a motor. Through gearing, the rotary motion from the motor is converted into linear displacement. Designs vary based on required speed, load capacity, or desired efficiency, but generally rely upon precise positioning of a lead screw and nut to translate motion and control placement of the load.

SUMMARY

Examples presented herein relate to a fault tolerant actuation system. The system includes an actuator having a position, a first sensor measuring a first parameter associated with the actuator, a second sensor measuring a second parameter associated with the actuator, a sensor fusion module receiving data from each of the first sensor and the second sensor and executing a sensor fusion process on the data received to estimate the position of the actuator, and a fault detection module. The fault detection module is configured to receive data from the first sensor and the second sensor, receive sensor fusion data from the sensor fusion module, compare the data received from the first sensor and the second sensor with the sensor fusion estimate, identify an error in the data received from the first sensor or the second sensor based on the comparison, and determine a fault exists in the first sensor or the second sensor based on the error.

In other examples presented herein, the first parameter and the second parameter are a same parameter. In yet other examples presented herein, the first parameter and the second parameter are a different parameter. In still other examples presented herein, the first parameter measures an input parameter of the actuator. In other examples presented herein, the second parameter measures an output parameter of the actuator.

In other examples presented herein, the fault detection module is further configured to determine which of the first sensor and the second sensor is associated with the fault. In still other examples presented herein, the fault detection module is further configured to provide feedback to the sensor fusion module and wherein the sensor fusion module, in response to the feedback, adjusts the sensor fusion process according to the feedback. In further examples presented herein, the feedback indicates that one of the first sensor and the second sensor has been isolated. In still further examples presented herein, the sensor fusion module, in response to the feedback, provides an alternative indication for the sensor that has been isolated. In other further examples presented herein, the sensor fusion module, in response to the feedback, adjust the weight applied to one of the first measurement and the second measurement.

Other examples presented herein relate to a method for real-time adjustment of a sensor fusion actuation system. The method includes receiving, from a first sensor, a first measurement of a first parameter associated with an actuator; assigning a first weight to the first measurement; receiving, from a second sensor, a second measurement of a second parameter associated with the actuator, assigning a second weight to the second measurement; executing a sensor fusion model to determine a position of the actuator using the first measurement and the second measurement; determining, based on the sensor fusion model, that one of the first measurement or the second measurement is more accurate; and adjusting at least one of the first weight or the second weight based on the determination.

In other examples presented herein, the first parameter and the second parameter are a same parameter. In still other examples presented herein, the first parameter and the second parameter are a different parameter. In yet other examples presented herein, the first parameter measures an input parameter of the actuator. In still other examples presented herein, the second parameter measures an output parameter of the actuator. In other examples presented herein, the fault detection module is further configured to determine which of the first sensor and the second sensor is associated with the fault.

In other examples presented herein, the fault detection module is further configured to provide feedback to the sensor fusion module and wherein the sensor fusion module, in response to the feedback, adjusts the sensor fusion process according to the feedback. In further examples presented herein, the feedback indicates that one of the first sensor and the second sensor has been isolated. In other further examples presented herein, the sensor fusion module, in response to the feedback, provides an alternative indication for the sensor that has been isolated. In still further examples presented herein, the sensor fusion module, in response to the feedback, adjust the weight applied to one of the first measurement and the second measurement.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts. Reference to various embodiments does not limit the scope of the claims attached hereto. Additionally, any examples set forth in this specification are not intended to be limiting and merely set forth some of the many possible embodiments for the appended claims.

Disclosed herein are devices, systems, and methods to provide robust estimation and control of the motion of an electro-mechanical actuator (EMA) using multiple sensors via sensor fusion techniques. Additionally, the disclosed systems and methods can provide fault tolerant control, fault detection, fault isolation, and sensor reconfiguration. Aspects of the present disclosure can be scaled to multiple applications within flight control. For example, secondary flight control mechanisms are shifting to more distributed electro-mechanical systems, such as EMA. These systems require a better sense of an actuator's position and health to provide better flap control and fault detection capabilities.

Figure 1:
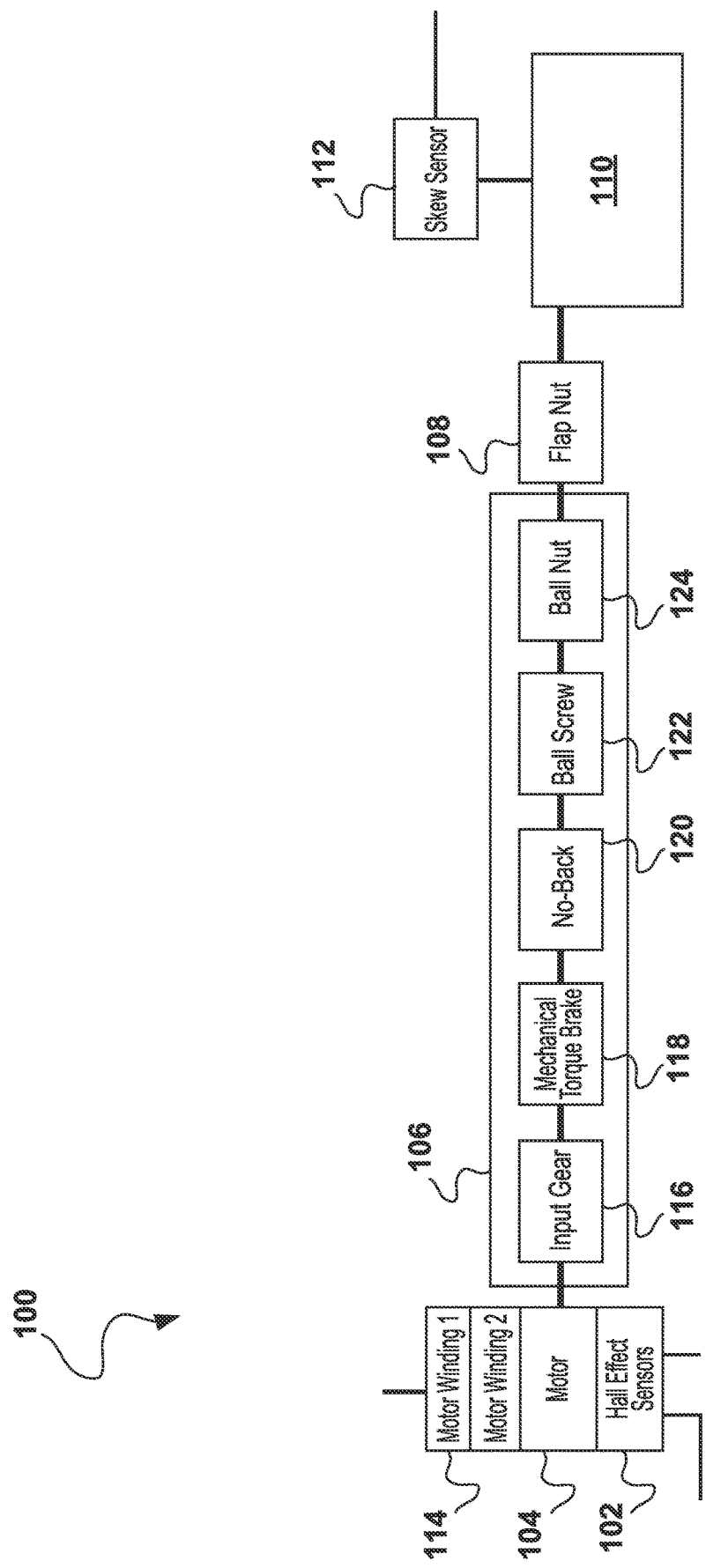
FIG. 1 is an example actuator operating in a sensor fusion system, according to aspects of the present disclosure.

Referring now to FIG. 1, an example EMA operating in a sensor fusion system 100 is shown, according to aspects of the present disclosure. Sensor fusion system 100 generally comprises an upstream sensor 102, a motor 104, an EMA 106, a flap nut 108, a flap 110, and a downstream sensor 112.

Sensor fusion system 100 may also comprise a computing device, such as computing device 500 in FIG. 5, discussed in more detail below, for receiving various inputs from the sensor fusion EMA system 100 and providing feedback to a user or another system and controls to the sensor fusion EMA system 100. The control provided to sensor fusion EMA system 100 by the computing device may be responsive to output received by the computing device from the various components of the sensor fusion EMA system 100. The computing device may receive inputs from the various components of the sensor fusion EMA system 100 by wired or wireless communication means.

The computing device may be any known computing device, such as a desktop, laptop, or tablet computer. The computing device may any device comprising at least a processor and a memory, such a non-transitory computer readable memory. The computing device may be a cloud-based or other distributed computing system. In embodiments, the computing device may be customized for sensor fusion EMA system 100 or may be integrated with other related systems. For example, in cases where sensor fusion EMA system is part a wing flap operation system of an aircraft, the computing device may be a flight computer incorporating or accessing software to support the sensor fusion EMA system. In embodiments, components of the sensor fusion EMA system 100 may communicate with a network, which in turn may communicate with or be integrated with a system related to or in association with the sensor fusion EMA system 100.

Upstream sensor 102 provides a measure of input into the EMA 106, such as from motor 104. In embodiments where input to EMA 106 is provided by a motor, such as motor 104, upstream sensor 102 may be integrated with motor 104 and provide data directly related to the operation of motor 104 such as RPM. In example system 100, upstream sensor 102 is a Hall effect sensor. Upstream sensor 102 provides data about motor 104 in operation that may be used for effective operation of motor 104 as well as its contribution to the sensor fusion system for operation of EMA 106. In embodiments, upstream sensor 102 may be one or more sensors, such as redundant sensors, backup sensors, or diverse sensors reading different parameters.

Motor 104 generally comprises one or more windings 114. In embodiments, upstream sensor 120 may be an integrated component of motor 104, such as one or more upstream sensors 102 as shown in example system 100. Motor 104 provides rotational input to EMA 102.

EMA 102 generally comprises an input gear 116, a torque brake 118, a no-back 120, a ball screw 122, and a ball nut 124. In embodiments, EMA 102 may further comprise a limit switch (not shown) to limit travel and prevent overextension and retraction.

Input gear 116 receives input, such as rotational input from motor 104, which drives EMA 102. In embodiments, input gear 116 is configured to reduce the rotational motion received from the motor 104 to a more effective speed for translation to the other components of EMA 102. In embodiments, input gear 116 is a gear box and may comprise one or more gears. Input gear 116 may be configured to increase the torque and/or reduce the speed of the rotational motion provided by motor 104. Input gear 116 transfers the output rotational motion to ball screw 122.

Torque brake 118 enables locking or stopping of EMA 106. In embodiments, torque brake 118 contributes to precise positioning of ball nut 124 and secure maintenance of a position of by ball screw 122. Torque brake 118 may comprise any suitable braking arrangement, such as permanent magnet brakes or spring-applied brakes, such as a wrap spring brake.

No-back 120 is a specialized braking device preventing backdrive of ball screw 122. In embodiments, ball screw 122 is self-locking lead screw and no-back 120 may be omitted.

Ball screw 122 is driven by rotational motion provided by motor 104 as translated by input gear 116. Ball screw 122 translates the received rotational motion to drive ball nut 124. Ball nut 124 moves towards or away from flap operation component 108 depending on the direction of rotation. Ball nut 124 provides output rotational motion from EMA 102 to a flap operation component 106.

Flap operation component 106 comprises one or more elements for translating movement actuated by EMA 102 into movement of a flap. In the example system 100, flap operation component 106 comprises a flap nut.

Downstream sensor 110 comprises a detector configured to provide feedback indicative of flap movement, such as skew sensor 110 as shown in example system 100. In embodiments, downstream sensor 112 provides a direct measurement of flap 110 position. In embodiments, downstream sensor 112 may be one or more sensors, such as redundant sensors, backup sensors, or diverse sensors reading different parameters. In embodiments, downstream sensor 110 provides a direct measurement of the position being monitored by the sensor fusion system.

Disclosed herein is a fault tolerant EMA design using sensor fusion with multiple sensors at diverse locations within a system, such upstream and/or downstream sensors.

Examples discussed here refer to a sensor fusion system with an upstream and downstream sensor, but those of skill in the art will understand that the principals of the present disclosure will be applicable to system with additional sensors, or sensors otherwise arranged. For example, the principles of the present disclosure would be applicable to a system with no upstream sensors, but a plurality of downstream sensors, either redundant with one another or monitoring different parameters associated with the position of interest.

The combination of these sensors through sensor fusion, for example using the Kalman filter as discussed in more detail in reference to example embodiments below, enables the incorporation of fault tolerant capability. Use of sensor fusion enables the detection of errors arising between the different sensors and sensor locations, such as between an upstream and a downstream measurement. Additionally, a system embodying the present disclosure may incorporate redundant sensors in multiple locations, such as the downstream and upstream measurement locations. If one of the sensors fails, the sensor fusion system can locate the faulty sensor and the system may response by initiating a healthy sensor to be used in its place within the sensor fusion algorithm and the system overall. In embodiments, multiple redundant sensors may be operating at once, such that failure of one sensor does not require corrective action beyond isolation of the faulty sensor.

It will be understood by those of skill in the art that various means of fusing sensor data are possible, and that the principals disclosed herein are applicable to and with a wide variety of sensor fusion techniques. Input provided by one or more of an upstream sensor and a downstream sensor can fused to achieve greater reliability and redundancy within the EMA system. It will be understood by those of skill in the art that sensors can be placed in various diverse locations within and around a system to be monitored, while still applying the subject matter of the present disclosure. Identification of a first and second sensor as upstream sensor 102 and downstream sensor 112, as seen in example system 100 of FIG. 1, is merely by way of example.

In an example using a Kalman filter for sensor fusion, a method of sensor fusion according to this example begins with establishing a state vector, a dynamics model, and a measurement model. The state vector may generally comprise four vectors including a relevant position of the EMA (x), velocity of the EMA (v), acceleration of the EMA (a), and a bias (b):

$$X = \begin{bmatrix} x \\ v \\ a \\ b \end{bmatrix}$$

Figure 2:
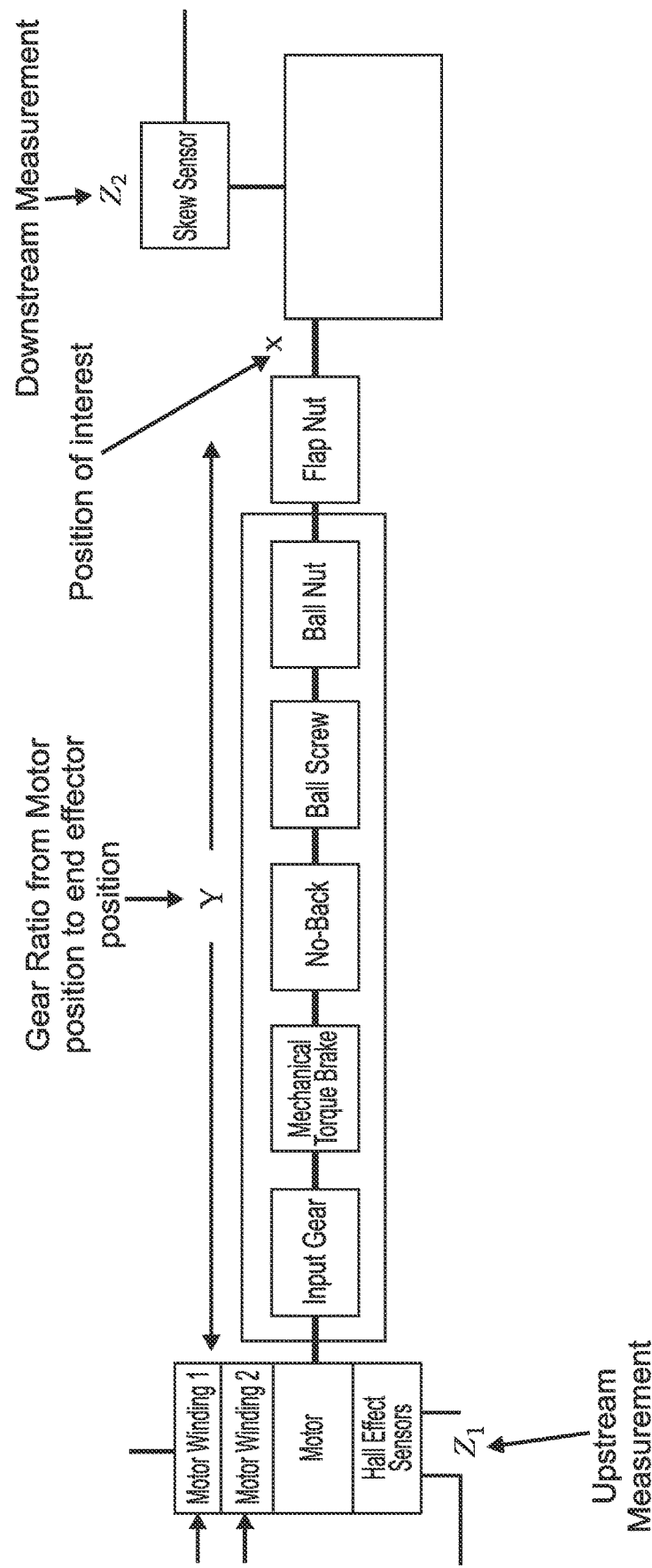
FIG. 2 is the example actuator of FIG. 1, annotated to show relevant sensor fusion data points, according to aspects of the present disclosure.

As shown in FIG. 2, position of interest is the relevant position of the EMA (x) and may be determined in a number of ways, but in the present example may be determined according to the position of the actuator screw, such as ball screw 122 of FIG. 1, which may be calculated using a gear ratio associated with the actuator (y). The velocity term (v) and the acceleration term (a) are associated with the EMA and determined based on measured motor speed ($z_1$).

The bias term (b) may be used to capture the difference between the two or more sensors used in the sensor fusion. For example, a vector of bias terms could be used to account for differences between a larger number of sensors. In the present example, referring back to sample system 100 of FIG. 1, bias (b) is used for the difference between the upstream sensor ($z_1$) and the downstream sensor measurement-based position ($z_2$). The bias term (b) may fully encompass differences between the two or more sensors. For example, bias (b) can estimate the effects of backlash in the system as any backslash present will contribute to differences between the two sensors. Other sources of difference between the sensors, such as slip clutch slipping and disconnect, by way of non-limiting examples, are also contemplated. Additionally, the measurements can be monitored and compared to expected values based on the dynamics model (discussed in more detail below) to identify if there is a fault with one of the sensors.

The dynamics model of the presented example is a constant acceleration dynamic model based on a constant velocity linear motion model at sample time. The dynamics model is further evaluated for A using a state transition matrix, which is used to propagate the state estimate and state error covariance matrix. The dynamics model provides for the calculation of a covariance ($P_k^-$) accounting for process noise (Q): $P_k^- = AP_{k-1}^- A^T + Q$. The process noise (Q) accounts for the uncertainty there is in the dynamics model, for example how much one or more of the states may change between samples that may not otherwise be captured by the dynamics model. Process noise (Q) is evaluated as a matrix and enables the dynamics model to scale with sample time, for example such that longer sample time means more uncertainty. Uncertainty in the bias term (b) can also be captured in the process noise (Q) matrix, such as to provide a relative quantification of the possible change in the bias term within one time step and the next.

The measurement model calculates a Kalman gain ($K_k$), associated with various weights assigned to the measurements received from the sensors, such as an upstream sensor and a downstream sensor, and the calculated or estimated system parameters. The measurement model also accounts for measurement noise (R): $K_k = P_k^- H^T (HP_k^- H^T + R)^{-1}$. Since the measurement noise (R) provides a model of the uncertainly of the measurements, it can used to adjust the weighting between the measurements. Measurement noise (R) is evaluated as a matrix, and can provide weights or confidence scores which may be applied by the system to one or more of the sensors to provide more reliable indications.

For example, considering example system 100 of FIG. 1, the sensors to be fused include a skew sensor 112 which provides a direct measurement of the flap position and a Hall effect sensor 102 which provides a measure of the driving input to move the flap, which can be used to calculate the flap position in conjunction with the flap's last known position. In this example, skew sensor 112 may generally be a more reliable measure of the flap's position, as the several links lying between the motor and the flap provide numerous points where error may be introduced into the calculation. However, when the flap is moving rapidly, skew sensor 112 may produce a noisier measurement and be less reliable. The speed of movement does not impact the reliability of the measurement and calculation from Hall sensor 102. Thus, when the flap is moving rapidly and skew sensor 112 has a less reliable measure, the system can adjust to placing greater weight on the calculation based on Hall sensor 102 and/or reducing the weight or confidence associated with skew sensor 112 by associating the measurement output from skew sensor 112 with a higher measurement noise.

The measurement model also incorporates a measurement residual, or innovation ($z_k - H\hat{x}_k^-$), which can be used in the position estimation to account for the different between the measured position provided by a direct sensor and the prediction based on an indirect sensor to assess which of the direct measure of the position and the calculated position based on the indirect measure is more reliable: $\hat{x}_k = \hat{x}_k^- + K_k(z_k - H\hat{x}_k^-)$. Integrating sensor fusion with the EMA provides for a system with capability for fault detection, fault location, and fault tolerant responsiveness. For example, by comparison between a direct measurement of a flap position and a calculated estimate of flap position, the relative reliability of the direct measurement and the input measurement to the calculated estimate can be evaluated. Thus, a sensor fusion output may not only indicate whether there is a fault based on disagreement between a measured and calculated position, but also whether the fault is in the direct or indirect sensor. The present disclosure provides for fault location in conjunction with fault detection, as well as fault tolerance as discussed in more detail below.

Figure 3:
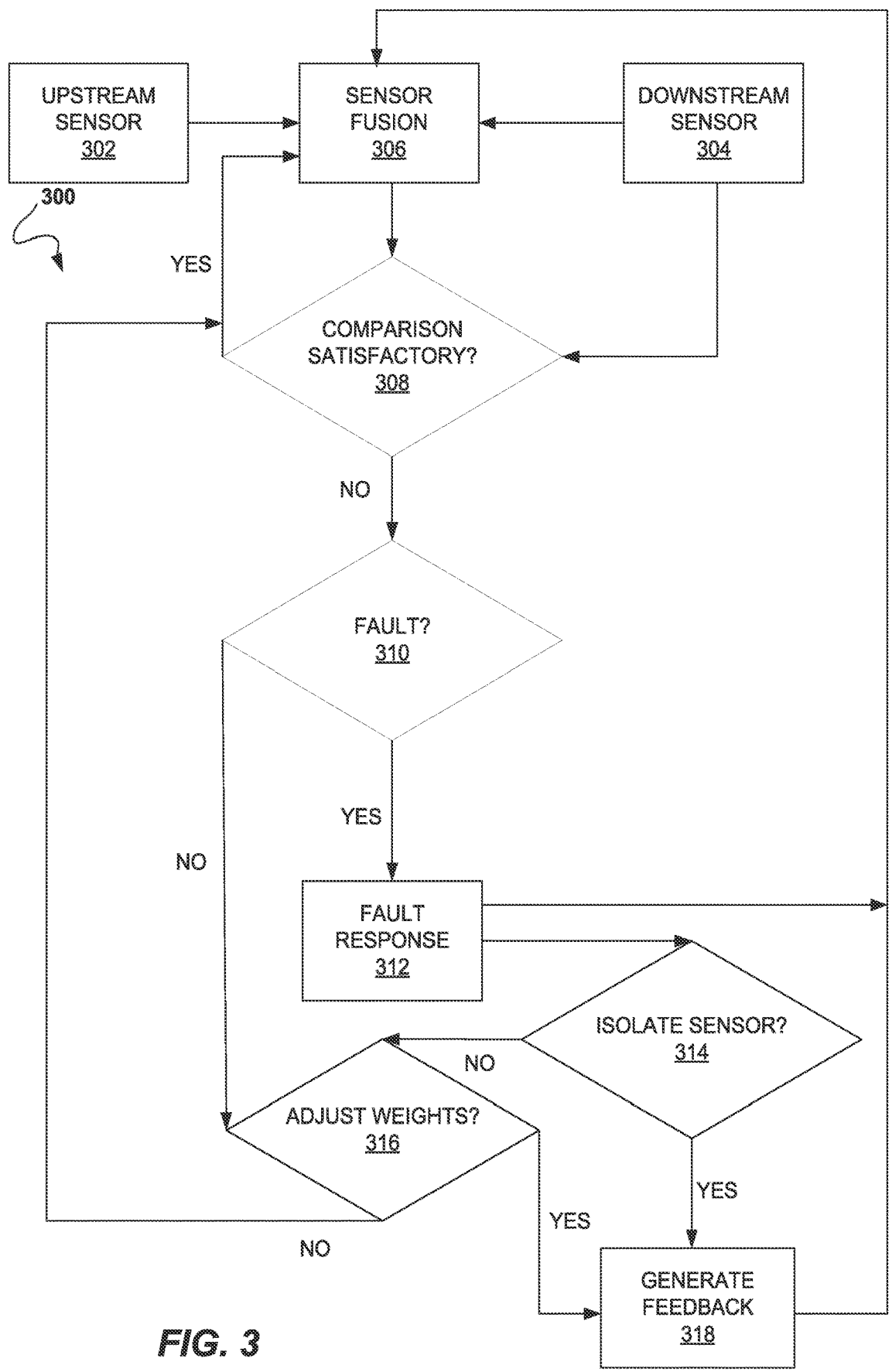
FIG. 3 is a flowchart of an example method of fault detection and response using a sensor fusion system embodying aspects of the present disclosure.

Referring now to FIG. 3, an example fault detection and response method 300 is shown, according to aspects of the present disclosure.

At 306, sensor fusion of the upstream measurement 302 and the downstream measurement 304 is performed. Sensor fusion 306 may be performed using the Kalman filter as discussed above, or may use other appropriate sensor fusion models, such as, other Bayesian networks, a Dempster-Shafer framework, convolutional neural networks, or Gaussian processing, by way of non-limiting examples. Sensor fusion 306 calculates an estimated position for the flap, compares the calculated and measured positions, and calculates confidence scores for the received measurements based on the comparison. Sensor fusion 306 may generate output data which may cause the system to make fault determinations or real-time adjustments or sensor fusion 306 may itself make fault determinations and appropriate adjustments. Some or all of the calculated values may be outputs of sensor fusion 306. In embodiments, sensor fusion 306 may output calculated values to a controller or other module and the controller or module may perform real-time adjustments to the system. In embodiments, sensor fusion 306 may be performed by a sensor fusion module configured to output commands based on the calculated values.

For example, at 308, the system may evaluate whether a comparison between the measured flap position and the calculated flap position is satisfactory. This evaluation may be performed by an overall system controller, by a sensor fusion module, or by specialized evaluation module. In embodiments, a satisfactory comparison may be determined according to any disagreement between the measured and calculated value being less than a threshold value. The threshold value may be a predetermined threshold value. In embodiments, the system may adjust the threshold value based on observed operational patterns of the system. If the comparison is found satisfactory, the system may proceed to maintain operations without adjustment and continue to update at the sensor fusion step 306.

However, if the comparison is not satisfactory, for example, if disagreement between the measured position and the calculated position exceeds a threshold, or if the uncertainty calculation for either value exceeds a threshold, the system may proceed to a fault analysis 310. The threshold value may be a predetermined threshold value. In embodiments, the system may adjust the threshold value based on observed operational patterns of the system.

A fault may be determined at fault analysis 310 based on predetermined criteria. The predetermined criteria may include, by way of non-limiting examples, a null value received from a sensor, a series of null values, a pattern of erratic values, or a value outside of an upper or lower boundary of expected values. If a fault is determined to be present, the system may initiate a fault response 312.

Fault response 312 may comprise identifying the location of the fault. In embodiments, sensor fusion 306 identifies the location of the fault. Fault response 312 may comprise isolating a faulty sensor 314 or initiating a redundant sensor to replace the faulty sensor. In embodiments, redundant sensors may already be in operation and the isolated sensor may be removed from the sensor fusion process 306 without replacement.

In embodiments, sensor fusion process 306 may be configured to provide alternative indication for system sensors that have failed. For example, considering example system 100 of FIG. 1, upstream 102 provides an indirect indication of flap position through calculation of the flaps movement based on the input provided by the motor 104 movement, but also provides direct indication of the operation of motor 104 and provides necessary information for proper control of motor 104. Thus, in the event that upstream 102 fails and a redundant or alternative sensor is not available, operation of control of motor 104 may be compromised. However, at fault response 312, upstream 102 can be determined to be faulty and, at sensor isolation 314, feedback is provided to sensor fusion process 306 that upstream 102 is unavailable. Sensor fusion process 306, which may be operating on a sensor fusion module, responds to the loss of upstream 102 by providing an alternative indication of the operation of motor 104. In much the same way that upstream 102 is able to provide indirect indication of the position of flap 110, downstream sensor 112 is able to provide an indirect indication of the operation of motor 104. A sensor fusion module, or a sensor or system controller, or a specialize fault response module, can calculate operational data about motor 104 based on the response produced at flap 110 and detected by downstream sensor 112.

If the sensor isolation analysis 314 determines it is not necessary to isolate the sensor, the system proceeds to evaluate if adjusting the weight 316 applied to the measurement received from the sensor is appropriate. If adjusting the weight is determined to be appropriate, feedback is generated 318 and sent to sensor fusion 306 indicating a new weight value for one or more sensors to reduce the effect of the faulty sensor on the sensor fusion and overall system. Thus, the parameters of the update following the fault identification and location can be adjusted to reflect the fault and continue to provide an accurate state estimate despite the presence of the fault. For example, if it is desirable to maintain a sensor online despite a fault, a higher measurement noise (R) can be associated with that sensor's measurements.

Fault analysis 310 may conclude that disagreement between the measured position and the calculated position does not rise to the level of indicating a fault. However, adjusting the weight given to a particular sensor may still be appropriate to achieve sufficient agreement between the measured position and the calculated position. Therefore, in embodiments, fault analysis 310 may proceed to evaluate the weights in view of the disagreement and may adjust weights 316 applied to the sensors even if no fault is found.

Weight adjustment analysis 316 generates feedback 318 for sensor fusion process 306 if weight adjustment is determined to be appropriate. If weight adjustment is not determined to be appropriate, the system returns to the sensor fusion process 306 and continues with the next update and continues to evaluate.

It will be understood by those of skill in the art that method 300 can be expanded out to more complex systems with a greater number of detectors. Example method 300 is discussed for simplicity in terms of two sensors and a single EMA but is applicable to systems incorporating additional sensors and EMAs. For example, in the context of flap operation on the wing of an aircraft, each flap may be positioned by two actuators. Embodiments of the present disclosure could be applied to integrate both actuators operating the flap and the four or more sensors used to monitor the flap and actuators using a central sensor fusion system. Further, a wing may have more than one flap, and embodiments of the present disclosure may be applied to integrate the actuators and sensors of all flaps on a wing. Embodiments of the present disclosure may be applied to integrate all actuators and sensors for flaps across both wings of an aircraft.

Figure 4:
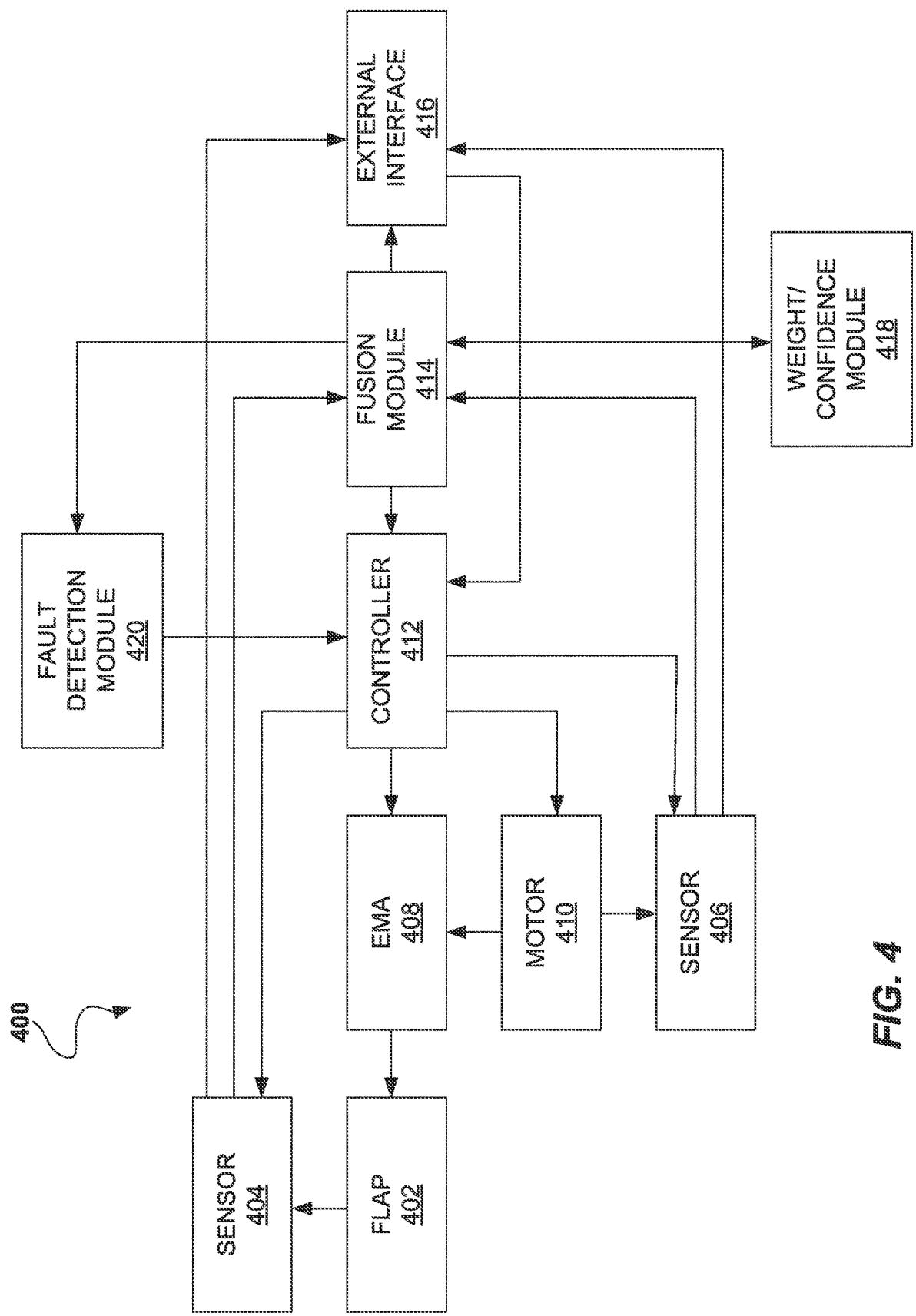
FIG. 4 is a block diagram of an example sensor fusion-actuator control system, according to aspects of the present disclosure.

Referring now to FIG. 4, a block diagram of an example system 400 for implementing sensor fusion methods, such as fault detection and response method 300, according to aspects of the present disclosure is shown. System 400 generally comprises a flap 402, at least two sensors 404, 406, an EMA 408, a motor 410, a controller 412, a fusion module 414

Flap 402 represents any appropriate load which may be driven by EMA 408. In embodiments, flap 402 may be a flap on a wing of an aircraft, but as will be understood by those of skill in the art, EMA 408 has wide applicability for the precise control of objects to remote operated.

Sensors 404, 406 may be an upstream sensor 404, such as upstream sensor 102 of FIG. 1, and a downstream sensor 406, such as downstream sensor 112 as seen in example system 100 of FIG. 1. In example system 400, sensor 404 may take a direct measurement of the position of flap 402 and sensor 406 may take a measurement of input provided to EMA 408, such a measure of speed provided by motor 410.

EMA 408 translates rotational motion provided by motor 410 to linear motion to drive flap 402. Motor 410 provides input motion to EMA 408 to move flap 402. Controller 412 provides control signals to adjust EMA 408 directly or by controlling motor 410.

Fusion module 414 receives measure input from sensors 404, 406 and performs a sensor fusion process, the output of which is provided to controller 412 to contribute to effective operation of EMA 408 and motor 410. Output from fusion module 414 may also be provided to an external interface 416.

External interface 416 may be an external device such as a display, which enables an operator to view data from sensors 404, 406 and sensor fusion 414 output, so that a user is able to monitor the state of the system 400. External interface 416 may also provide control functions and interact with controller 412 to provide for manual operation of system 400.

Fusion module 414 may also communicate with a weight/confidence module 418. Weight/confidence module 418 evaluates the weights applied to the measurements from each of sensors 404, 406 and updates the weights based on confidence scores associated with each of sensor 404, 406. Confidence scores may be determined according to output from fusion module 414. Weight/confidence module 418 may store predetermined threshold confidence scores for each of sensor 404, 406 to determine when the weights should be adjusted. In embodiments, weight/confidence module 418 may not present, and it's functionality may be otherwise integrated, such as into fusion module 414 or controller 412.

Fault detection module 420 receives sensor measurement and sensor fusion calculation input from sensor fusion module 414 and provides sensor status analysis and determinations of fault response to controller 412. In embodiments, fault detection module 420 receives sensor measurement input directly from sensors 404, 406. In embodiments, fault detection module 420 provides fault response instructions direction to sensors 404, 406.

Embodiments of the systems and methods disclosed herein can be implemented on a computing device. Referring now to FIG. 5, a block diagram of an example of a computing system 500 is shown, upon which aspects of the present disclosure may be implemented. In embodiments, computing system 500 is deployed as a component of a cloud computing node.

Computing system 500, which works with other general purpose or special purpose computing system environments or configurations. Examples of well-known computing systems, environments, or configurations that may be suitable for use with computing system 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computing system 500 may be described in the general context of computer system-processing instructions, such as program modules, being processed by a computer system. Generally, program modules may include routines, programs, objects, components, logic, data structures, and so on that perform particular tasks or implement particular abstract data types. Computing system 500 may be practiced in distributed cloud computing environments where tasks are performed by remote processing devices that are linked through a communications network. In a distributed cloud computing environment, program modules may be located in both local and/or remote computer system storage media including memory storage devices.

Figure 5:
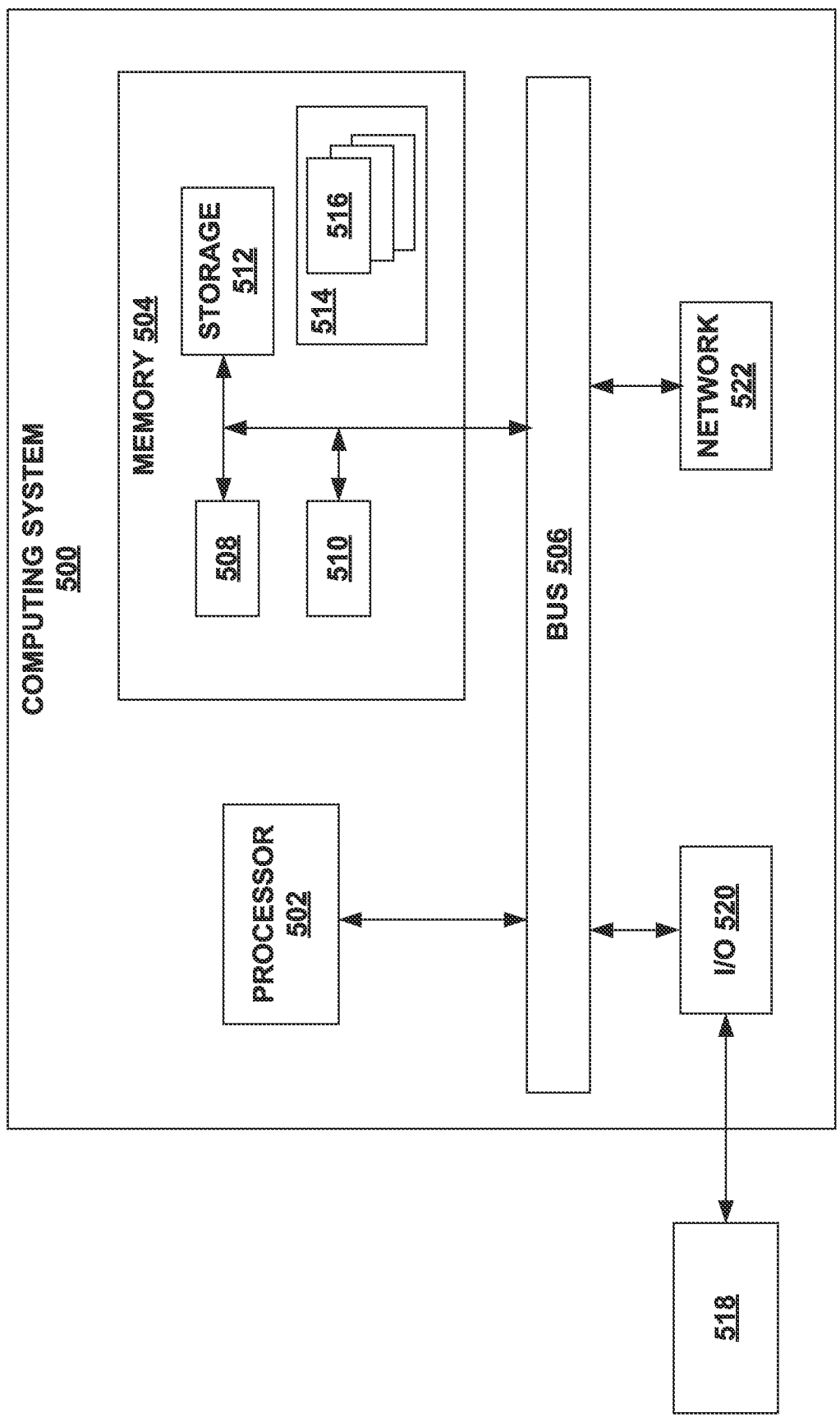
FIG. 5 is a block diagram of an example computer system, upon which systems and method embodying aspects of the present disclosure may operate.

As depicted in FIG. 5 computing system 500 is shown in the form of a general-purpose computing device. The components of computing system 500 may include, but are not limited to, one or more processors 502, memory 504, and bus 506 that couples various system components, including memory 504, to processor 502.

Processor 502 processes instructions for software that may be loaded into memory 504. Processor 502 may be a number of processors, a multi-processor core, or some other type of processor, depending on the particular implementation. Further, processor 502 may be implemented using one or more different processor systems in which a main processor is present with secondary processors, and may be on a single chip. In another example, processor 502 may be a symmetric multi-processor system containing multiple processors of the same type.

Bus 506 represents one or more of any of several types of bus structures, including a memory bus or memory controller, a peripheral bus, an accelerated graphics port, and a processor or local bus using any of a variety of bus architectures. By way of example and not limitation, such architectures include Industry Standard Architecture (ISA) bus, Micro Channel Architecture (MCA) bus, Enhanced ISA (EISA) bus, and Peripheral Component Interconnects (PCI) bus.

Computing system 500 may include a variety of computer system readable media. Such media may be any available media that is accessible by computing system 500 and includes both volatile and non-volatile media and removable and non-removable media.

Memory 504 can include computer system readable media in the form of volatile memory, such as random access memory (RAM) 508 and/or cache 510. Computing system 500 may further include other removable/non-removable, volatile/non-volatile computer system storage media. By way of example only, storage system 512 can be provided for reading from and writing to a non-removable, non-volatile magnetic media, such as a hard drive. Although not shown, a magnetic disk drive for reading from and writing to a removable, non-volatile magnetic disk, and an optical disk drive for reading from or writing to a removable, non-volatile optical disk, or other optical media can be provided. In such instances, each can be connected to bus 506 by one or more data media interfaces. Memory 504 may include at least one program product having a set of program modules that are configured to carry out the functions of embodiments of the invention. As used herein, a set, when referring to items, means one or more items. For example, a set of program modules is one or more program modules.

Program 514, having a set of program modules 516, may be stored in memory 504, by way of example, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention as described herein. Program modules 516 include fusion module 414, weight/confidence module 418, and fault detection module 420.

Computing system 500 may also communicate with one or more external devices 518, such as a keyboard, a mouse, a display, or one or more other devices to enable a user to interact with computing system 500. External devices 518 may further include any devices (e.g., network card, modem, etc.) that enable computing system 500 to communicate with one or more other computing devices. These communication can occur via I/O interface 520. I/O interface 520 may correspond to external interface 416. Computing system 500 can communicate with one or more networks, such as a local area network (LAN), a general wide area network (WAN), or a public network, such as the Internet via network adapter 522.

Network adapter 522 communicates with other components of computing system 500 via bus 506. Other hardware and/or software components, which may not be depicted in FIG. 5, are able to be used with computing system 500. Examples include, but are not limited to, microcode, device drivers, redundant processor units, external disk drive arrays, RAID systems, tape drives, and data archival storage systems, etc.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A fault tolerant actuation system comprising:
    an actuator having a position;
    a first sensor measuring a first parameter associated with the actuator;
    a second sensor measuring a second parameter associated with the actuator;
    a sensor fusion module receiving data from each of the first sensor and the second sensor and executing a sensor fusion process on the data received to estimate the position of the actuator; and
    a fault detection module configured to:
        receive data from the first sensor and the second sensor;
        receive sensor fusion data from the sensor fusion module;
        compare the data received from the first sensor and the second sensor with the sensor fusion estimate;
        identify an error in the data received from the first sensor or the second sensor based on the comparison; and
        determine a fault exists in the first sensor or the second sensor based on the error.

2. The fault tolerant actuation system of claim 1, wherein the first parameter and the second parameter are a same parameter.

3. The fault tolerant actuation system of claim 1, wherein the first parameter and the second parameter are a different parameter.

4. The fault tolerant actuation system of claim 1, wherein the first parameter measures an input parameter of the actuator.

5. The fault tolerant actuation system of claim 1, wherein the second parameter measures an output parameter of the actuator.

6. The fault tolerant actuation system of claim 1, wherein the fault detection module is further configured to determine which of the first sensor and the second sensor is associated with the fault.

7. The fault tolerant actuation system of claim 1, wherein the fault detection module is further configured to provide feedback to the sensor fusion module and wherein the sensor fusion module, in response to the feedback, adjusts the sensor fusion process according to the feedback.

8. The fault tolerant actuation system of claim 7, wherein the feedback indicates that one of the first sensor and the second sensor has been isolated.

9. The fault tolerant actuation system of claim 8, wherein the sensor fusion module, in response to the feedback, provides an alternative indication for the sensor that has been isolated.

10. The fault tolerant actuation system of claim 7, wherein the sensor fusion module, in response to the feedback, adjusts a weight applied to one of the first measurement and the second measurement.

11. A method for real-time adjustment of a sensor fusion actuation system comprising:
    receiving, from a first sensor, a first measurement of a first parameter associated with an actuator;
    assigning a first weight to the first measurement;
    receiving, from a second sensor, a second measurement of a second parameter associated with the actuator;
    assigning a second weight to the second measurement;
    executing a sensor fusion model to determine a position of the actuator using the first measurement and the second measurement;
    determining, based on the sensor fusion model, that one of the first measurement or the second measurement is more accurate; and
    adjusting at least one of the first weight or the second weight based on the determination.

12. The method for real-time adjustment of the sensor fusion actuation system of claim 11, wherein the first parameter and the second parameter are a same parameter.

13. The method for real-time adjustment of the sensor fusion actuation system of claim 11, wherein the first parameter and the second parameter are a different parameter.

14. The method for real-time adjustment of the sensor fusion actuation system of claim 11, wherein the first parameter measures an input parameter of the actuator.

15. The method for real-time adjustment of the sensor fusion actuation system of claim 11, wherein the second parameter measures an output parameter of the actuator.

16. The method for real-time adjustment of the sensor fusion actuation system of claim 11, wherein a fault detection module is configured to determine which of the first sensor and the second sensor is associated with a fault.

17. The method for real-time adjustment of the sensor fusion actuation system of claim 16, wherein the fault detection module is further configured to provide feedback to the sensor fusion model and wherein the sensor fusion model, in response to the feedback, adjusts a sensor fusion process according to the feedback.

18. The method for real-time adjustment of the sensor fusion actuation system of claim 17, wherein the feedback indicates that one of the first sensor and the second sensor has been isolated.

19. The method for real-time adjustment of the sensor fusion actuation system of claim 18, wherein the sensor fusion model, in response to the feedback, provides an alternative indication for the sensor that has been isolated.

20. The method for real-time adjustment of the sensor fusion actuation system of claim 17, wherein the sensor fusion model, in response to the feedback, adjust the weight applied to one of the first measurement and the second measurement.

* * * * *